United States Patent [19]

Rowan et al.

[11] Patent Number: 4,916,370
[45] Date of Patent: Apr. 10, 1990

[54] MOTOR STOPPAGE APPARATUS AND METHOD USING BACK EMF VOLTAGE

[75] Inventors: Timothy M. Rowan, Wauwatosa; Robert J. DeLange, St. Francis, both of Wis.

[73] Assignee: Allen-Bradley Company, Inc., Milwaukee, Wis.

[21] Appl. No.: 343,439

[22] Filed: Apr. 26, 1989

[51] Int. Cl.$^4$ .............................................. H02P 3/00
[52] U.S. Cl. ................................... 318/368; 318/757
[58] Field of Search ............... 318/227, 257, 258, 269, 318/275, 331, 364, 368, 729, 757, 758, 759, 760, 761, 762, 772, 763, 703

[56] References Cited

U.S. PATENT DOCUMENTS

| | | | |
|---|---|---|---|
| 3,652,924 | 3/1972 | Dieterich et al. | 323/24 |
| 3,795,850 | 3/1974 | Grygera | 318/331 |
| 4,238,717 | 12/1980 | Knight et al. | 318/703 |
| 4,417,191 | 11/1983 | Schmidt | 318/760 |
| 4,459,528 | 7/1984 | Nola | 318/729 |
| 4,459,529 | 7/1984 | Johnson | 318/729 |
| 4,518,902 | 5/1985 | Melocik et al. | 318/258 |
| 4,612,490 | 9/1986 | Kagi | 318/761 |
| 4,833,386 | 5/1989 | Unsworth | 318/763 |

OTHER PUBLICATIONS

Smart Motor Controller (SMC), Bulletin 150-2.1-Apr., 1986.
Product Date Smart Motor Controller (SMC), Publication 150-2.1; Apr., 1986; Allen-Bradley Company, Inc.

Primary Examiner—William M. Shoop, Jr.
Assistant Examiner—John W. Cabeca
Attorney, Agent, or Firm—Quarles & Brady

[57] ABSTRACT

An electric motor is braked by applying pulses of current to a winding of the motor creating a negative torque which slows the motor. In order to detect when the motor has stopped and as a consequence, when to discontinue applying the current pulses, a periodic determination is performed as to whether the back emf voltage induced in a winding of the motor is within a range of defined values, such as between a positive reference voltage level and a negative reference voltage level. The application of pulses of current is terminated a given interval from when a predetermined number of consecutive determinations all indicate that the back emf voltage is within the range. The length of the given interval is derived from the amount of time between when the electricity began to be applied to brake the motor and the occurrence of the predetermined number of consecutive determinations.

23 Claims, 4 Drawing Sheets

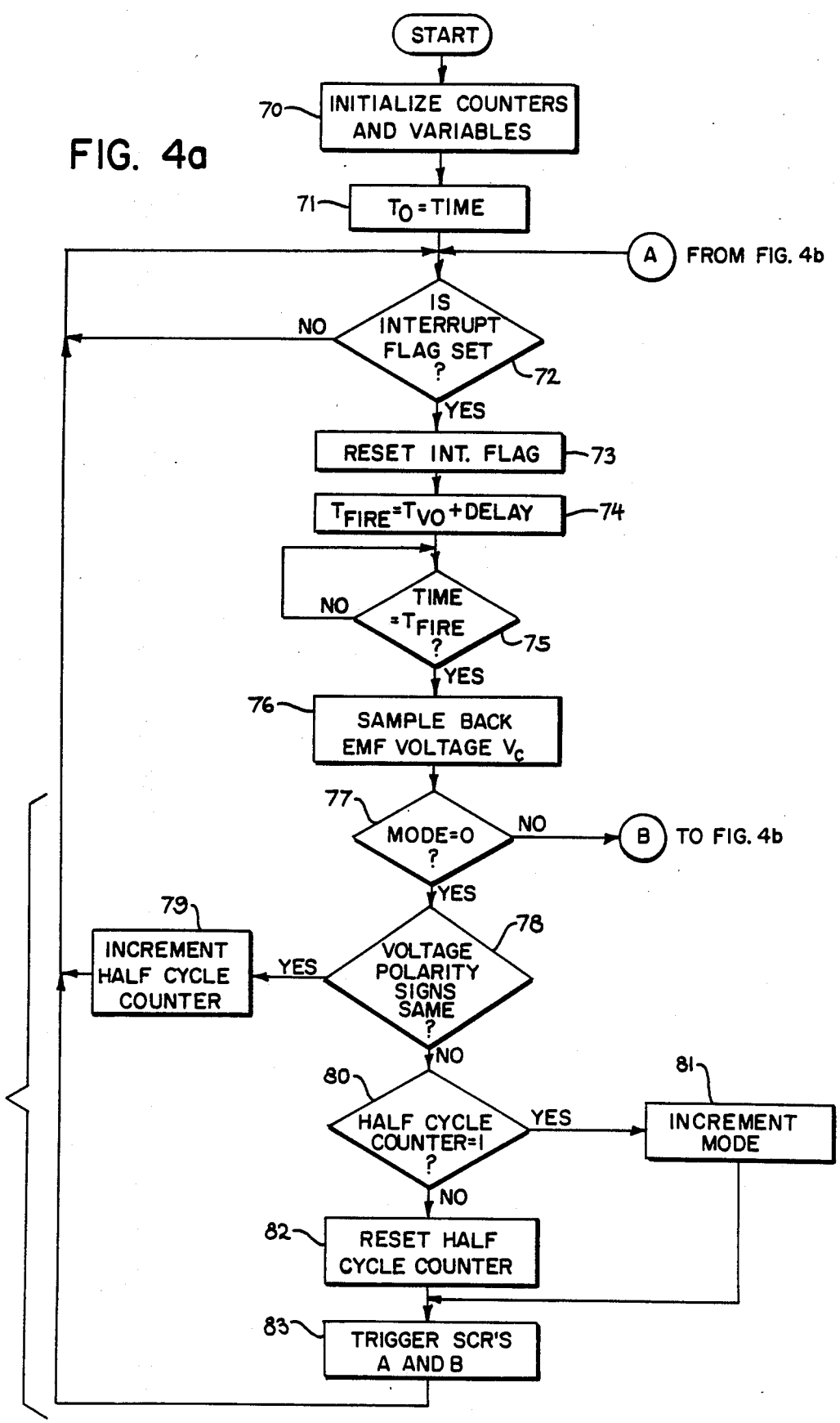

CONTINUOUS TRIGGERING MODE

MOTOR STOPPAGE APPARATUS AND METHOD USING BACK EMF VOLTAGE

BACKGROUND OF THE INVENTION

The present invention relates to electric motor braking, and particularly to methods for detecting when the motor has stopped.

When an electric motor is started, the electric current drawn by the motor can be six times the steady state current once it reaches full speed. Manufacturing equipment and assembly lines often have a number of large three-phase electric motors which start simultaneously thereby placing relatively large current demands on the electrical distribution system feeding the equipment or assembly line. In order to reduce this start-up current consumption, large alternating current electric motors are often operated by a controller which activates thyristor switches that couple the motor to an electric supply. When the motor is to be started, the equipment operator applies a starting signal to the motor controller. As is well known, the motor controller then gradually increases the amount of current applied to the motor by regulating the duty cycles of the thyristors. Initially the thyristors are conductive for only a brief portion of each half cycle of the a.c. voltage for the corresponding electricity phase. The controller then gradually increases the conductive time of the thyristors until they are turned on constantly at which time the motor is at substantially full speed. This technique reduces the current consumption and torque of the motor during start-up as compared to a hard switching the full supply line voltage across the motor.

Previous motor controllers often did not provide a mechanism for braking the motor when it was stopped. In response to an operator command to stop the motor, the basic controller simply turns off the thyristors allowing the motor to coast to a stop, slowed only by friction. If the motor is coupled to a mechanical load with considerable inertia, the motor and the load will continue to move for some time after the power is shut off. In many industrial applications of motors, it is important for convenience and efficient use of the driven equipment to stop this continued movement as fast as possible. Merely allowing the motor to coast to a stop often is unsatisfactory. Heretofore, a mechanical brake frequently was coupled to the equipment and engaged when the power was turned off.

As an alternative, a direct current was sometimes applied to the stator windings of an alternating current motor to provide a braking action. In order to electrically brake an alternating current motor, it is necessary to generate a torque in the direction opposite to the direction of the rotation of its rotor (i.e. a negative torque). In the direct current braking method of the prior art, the torque is produced by the rotor attempting to rotate in the presence of a steady magnetic field produced by the direct current applied through the stator windings. The rotating direction of the rotor's magnetization leads the direction of the magnetic field produced by the direct current through stator winding. The tendency of the rotor magnetization to align itself with the stator's magnetic field creates an alignment torque which produces a braking effect on the rotor.

Another method of braking the motor involves switching the alternating current to the motor at the proper times to create a magnetic field within the motor which tends to slow the rotor. This technique is described in U.S. patent application Ser. No. 07/103,729, filed on Oct. 2, 1987, and assigned to the same assignee as the present invention.

One of the problems inherent in any braking technique that applies electricity to the motor, is determining when the motor has stopped so that the application of the braking current can be discontinued. Not only is the continued application of the braking current inefficient from an energy conservation standpoint, it also may also have adverse effects on the motor.

Heretofore, a timer frequently was employed for such braking methods with the braking electricity applied for a long enough interval to insure that the motor was stopped. This interval had to be empirically set by the operator for the specific motor being controller. If the load on the motor varies, thereby affecting the stopping time, the interval has to be set for the worst case, or longest possible stopping interval. This too would be inefficient when the load inertia was small and the motor stops in a fraction of the worst case interval.

SUMMARY OF THE INVENTION

An alternating current electric motor is stopped by disconnecting the normal electric supply to the motor. Electricity is then reapplied to the motor in a manner which creates a magnetic field within the motor which tends to slow the rotation of the rotor. This reapplication of electricity continues until the rotor has substantially stopped. In the preferred embodiment, pulses of electric current initially are applied whenever the polarity of the back emf voltage induced in a winding of the motor is opposite to the polarity of the alternating voltage from the source of electric current. When this electric current begins to be applied to the motor during every cycle of the alternating voltage, the current continues to be applied during every cycle regardless of the polarity of the back emf voltage.

The stoppage of the motor is determined by sampling the voltage induced in a stator winding of the motor by the back electromotive force (emf). This back emf induced voltage is compared to at least one reference voltage level. Preferably, the back emf voltage is compared to both a positive reference voltage level and a negative reference voltage level to determine if the voltage is between the reference voltage levels. When the back emf induced voltage is between the positive and negative reference voltage levels for a predefined interval, an indication is given that the motor is about to stop. This indication initiates a delay interval in the preferred embodiment of the invention. Upon the expiration of the delay interval, a determination is made that the motor has stopped. The delay interval can either be a fixed period or one which is calculated based on the amount of time that it took for the motor to go from full speed to the time when the indication was given. Upon a determination that the motor has stopped, the application of electricity to the motor is terminated.

An object of the present invention is to provide a method for detecting when an electric motor has stopped.

Another object is to detect when an electric motor has stopped by detecting a predetermined pattern in the back emf voltage across the motor winding.

Still another object is to perform this detection by sensing when the back emf voltage is within a range of voltages, substantially centered about zero volts, for a set period of time.

A further object is to determine that the motor has stopped an interval of time after the back emf voltage is sensed within the voltage range and to provide a method of calculating this interval.

Yet another object of the present invention is to brake an electric motor by applying electricity to it to create a magnetic field which slows the rotor. Such electricity is applied until the motor substantially stops.

BRIEF DESCRIPTION OF THE DRAWINGS

FIGS. 4A and 4B comprise a flow chart of the motor controller's software routine for braking the motor according to the present invention.

DETAILED DESCRIPTION OF THE INVENTION

Figure 1:
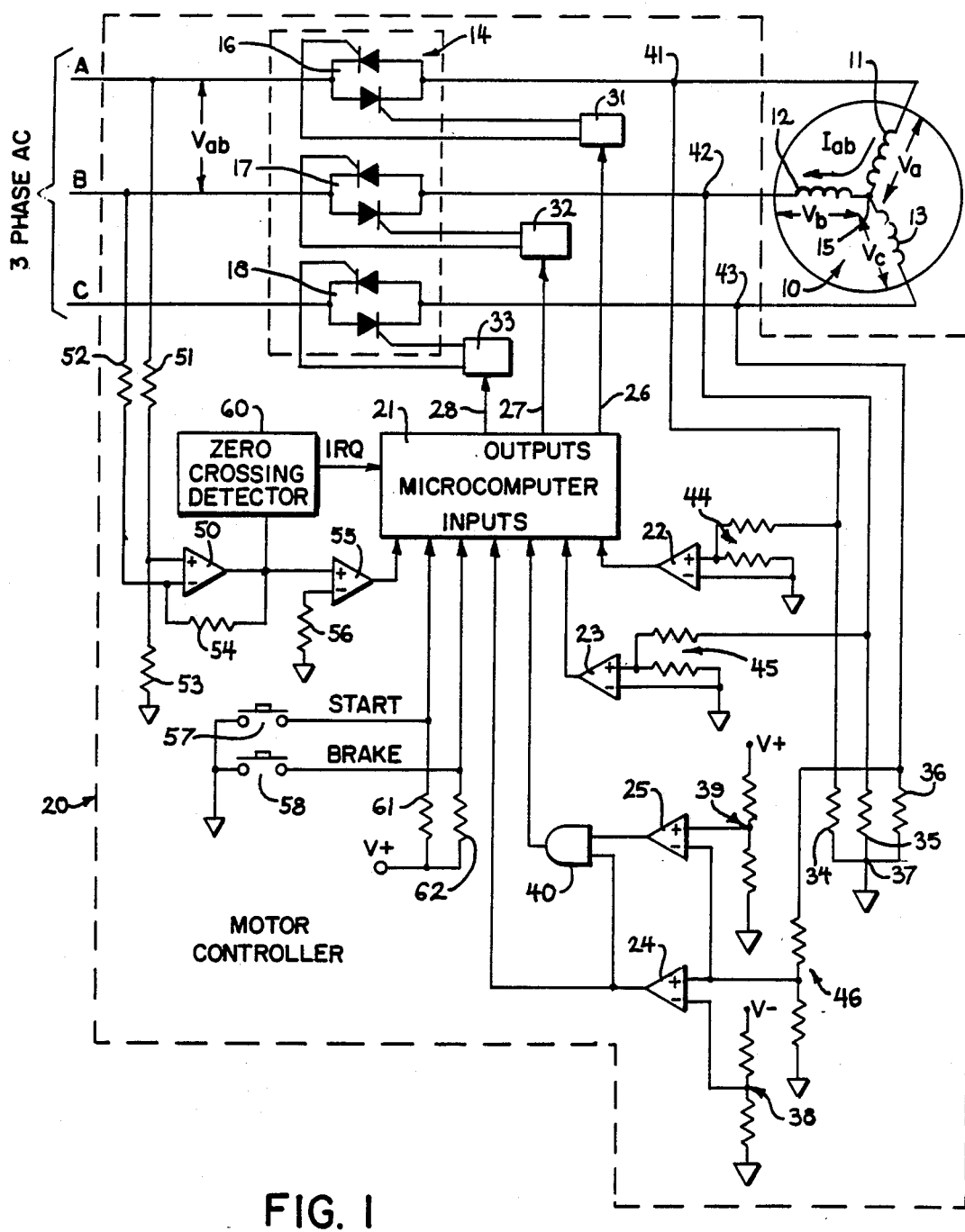
FIG. 1 is a schematic diagram illustrating an electric motor and a motor controller for practicing the present invention.

With initial reference to FIG. 1, a three-phase electric motor 10 has three stator windings 11, 12 and 13. The application of electricity to the motor 10 is regulated by a motor controller 20, having a thyristor switch module 14. The switch module 14 includes three pairs of SCR's 16, 17, and 18 with the SCR's in each pair connected in an anti-parallel relationship. Each SCR pair couples one of the stator windings 11, 12 or 13 to a supply line A, B, or C from a source of three-phase alternating electricity.

The SCR pairs 16-18 are triggered, or fired, by a control circuit that includes a microcomputer 21, five voltage comparators 22, 23, 24, 25 and 55, AND gate 40, a differential amplifier 50, and a zero voltage crossing detector 60. The microcomputer 21 may be a 6801 type sold by Hitachi America, Ltd., which contains a microprocessor, timer circuits, a read only memory, and a random access memory in the same integrated circuit package. The program for controlling the operation of the motor controller 20 is stored in the read only memory. This program is similar to those used with conventional motor controllers insofar as the functions of starting and operating the motor at its normal running speed. As will be explained in detail, the program contains a novel routine for braking the motor 10 and determining when it has stopped.

The microcomputer 21 generates properly timed thyristor trigger signals on three lines 26, 27, and 28 of a parallel output port. The first output line 26 is coupled by a first conventional isolation transformer 31 to the gate terminals of the first pair of SCR's 16 for electricity supply line A. The other trigger signal output lines 27 and 28 are coupled by similar isolation transformers 32 and 33 to the gate terminals of the second and third SCR pairs 17 and 18, respectively, for electricity supply lines B and C.

Three terminals 41, 42, and 43 couple each of the stator windings 11-13 to the motor controller 20. Three equal value resistors 34-36 are coupled to terminals 41-43 in a Y connection with the common node 37 of the Y connected to the ground of the control circuit. The voltage across each resistor 34, 35, and 36 equals the voltage Va, Vb, and Vc across the three stator windings 11, 12, and 13, respectively. The potential at the common node 37 of the Y resistor connection is the same as the neutral node 15 of the motor windings, which is substantially equal to ground potential.

Four voltage comparators 22, 23, 24, and 25 sense the voltage across the stator windings 11-13. The non-inverting input of three of these voltage comparators 22, 23, and 24 is coupled by a separate voltage divider 44, 45, or 46 to one of the stator winding terminals 41, 42, or 43, respectively. The three voltage dividers 44-46 reduce the stator winding voltages to levels compatible with the comparators 22, 23, and 24. The outputs of the three comparators 22, 23, and 24 are connected to three lines of a parallel input port of the microcomputer 1.

The inverting inputs of voltage comparators 22 and 23 are connected to the circuit ground. The inverting input of voltage comparator 24 is connected to a preset negative voltage supplied by a fourth voltage divider 38 coupled between a negative voltage source V⁻ and ground. Voltage comparator 24 produces an output which indicates whether the back emf voltage across the third motor winding 13 is above or below a negative reference voltage $V^-_{REF}$. The negative reference voltage $V^-_{REF}$ is in the range between negative two volts and ground potential (e.g. $-1$ volt). It should be noted that because the back emf voltage is stepped down by the third voltage divider 46, voltage comparator 24 actually compares this stepped down voltage to a lower voltage level than $V^-_{REF}$. However, the comparator 24 and voltage dividers 38 and 46 form a means which performs the function of comparing the back emf voltage across the third motor winding 13 to the negative reference voltage.

The center node of the third voltage divider 46 is also connected to the inverting input of voltage comparator 25. A fifth voltage divider 39 is coupled between the positive voltage source V⁺ and ground to supply a preset positive voltage to the inverting input of voltage comparator 25. Voltage comparator 25 produces an output which indicates whether the back emf voltage across the third motor winding 13 is above or below a positive reference voltage $V^+_{REF}$. The positive reference voltage $V^-_{REF}$ is in the range between ground potential and two volts (e.g. one volt) and does not necessarily have the same value as the absolute value of the negative reference voltage $|V^-_{REF}|$. Therefore, the comparator 25 and voltage dividers 46 and 39 form a means for comparing the back emf voltage induced in the third motor winding 13 to the positive reference voltage.

The outputs of voltage comparators 24 and 25 are connected to inputs of AND gate 40, whose output is coupled to another input of the microcomputer 21. The AND gate 40 logically combines the outputs of comparators 24 and 25 to produce an output signal which indicates when the back emf voltage is between the positive and negative reference voltage levels. Due to differences in the voltage comparator operation, the AND gate output may in practice indicate when the back emf voltage is equal to or between the two reference voltage levels. This difference is inconsequential to the overall operation of the circuit and both indications are considered to be equivalent insofar as the present invention is concerned. Alternatively, the outputs of both voltage comparators 24 and 25 can be coupled directly to inputs of the microcomputer 21 and the logical operation of AND gate 40 can be performed by the microcomputer software.

The A and B supply lines are separately coupled by resistors 51 and 52 to the non-inverting and inverting inputs of a differential amplifier 50. The non-inverting input is also coupled to the circuit ground by resistor 53. A feedback resistor 54 is connected between the output of the differential amplifier 50 and its inverting input. The output of the differential amplifier 50 is connected to the non-inverting input of voltage comparator 55 whose inverting input is coupled to ground by resistor 56. The output of voltage comparator 55 is connected to another line of the microcomputer parallel input port. The level of this input indicates the polarity of the voltage Vab across A and B supply lines with respect to ground. The output of the differential amplifier 50 is further connected to a zero crossing detector 60 which senses when the voltage output of the differential amplifier, and hence the voltage Vab across supply lines A and B, goes through zero volts. The output signal from the zero crossing detector 60 is connected to an interrupt input (IRQ) of the microcomputer 21.

Additional input port lines of the microcomputer 21 are connected to two manual pushbutton switches 57 and 58. These additional input port lines are also coupled by a pair of pull-up resistors 61 and 62 to the positive voltage supply for the motor controller 20. Activation of these switches 57 and 58 pulls the corresponding microcomputer input line to ground. The first switch 57 is activated to start the motor 10 and the second switch 58 initiates the motor braking function, as will be described.

In response to the closure of the first pushbutton switch 57, the microcomputer 21 commences executing a conventional program for starting and controlling the normal running of the motor 10. However, the motor controller 20 offers the operator an improved method for stopping the motor. By pressing the second pushbutton switch 58, the operator initiates the braking function of the motor controller 20 which stops the motor faster than by simply disconnecting the electricity.

The braking technique involves applying current pulses to the motor 10 at specific times to generate an electromagnetic field which produces a negative motor torque thereby slowing the motor's rotor. It has been determined that this can be achieved by applying the alternating electricity when the polarity of its instantaneous supply voltage is opposite to the polarity of the back electromotive force (emf) induced voltage of the motor (i.e. one of these voltages is positive and the other is negative with respect to ground potential). The back emf results from the magnetism of the rotor and the rotating magnetic field produced by that magnetism as the rotor slows. As used herein, the terms "back emf voltage" and "back emf induced voltage" refer to the voltage induced in a winding of the motor by this rotating magnetic field at periods when electricity is not being applied to brake the motor.

Specifically, referring to FIG. 1, the back emf induced voltage Vc across the third stator coil 13 is sensed by voltage comparator 24. The output of voltage comparator essentially represents the polarity of the sensed back emf induced voltage. Note that the voltage comparator 24 actually compares the back emf voltage Vc of the third stator winding 13 to the small negative voltage and not to ground. If a more true sensing of this back emf voltage Vc is desired, a separate voltage comparator can be provided which compares the back emf voltage Vc to ground. The polarity of the alternating supply voltage Vab across lines A and B is sensed by the fifth voltage comparator 55. After each zero voltage crossing of the supply voltage Vab as sensed by detector 60, the microcomputer 21 examines the polarity of the two sensed voltage samples. If the polarities are opposite (i.e. one is positive and the other negative with respect to circuit ground), the pairs of SCR's 16 and 17 for the A and B supply lines are triggered by a short pulse applied to their gate electrodes after a fixed delay from the occurrence of the zero crossing. The delay can be set to any interval up to almost one half the period of the supply voltage. The shorter the delay the more current is applied to the motor and the greater the braking effect. When triggered, the pairs of SCR's 16 and 17 apply current to the motor until the alternating supply current Iab passes through zero amperes, at which point the SCR's automatically turn off until triggered again by the microcomputer 21.

Figure 2:
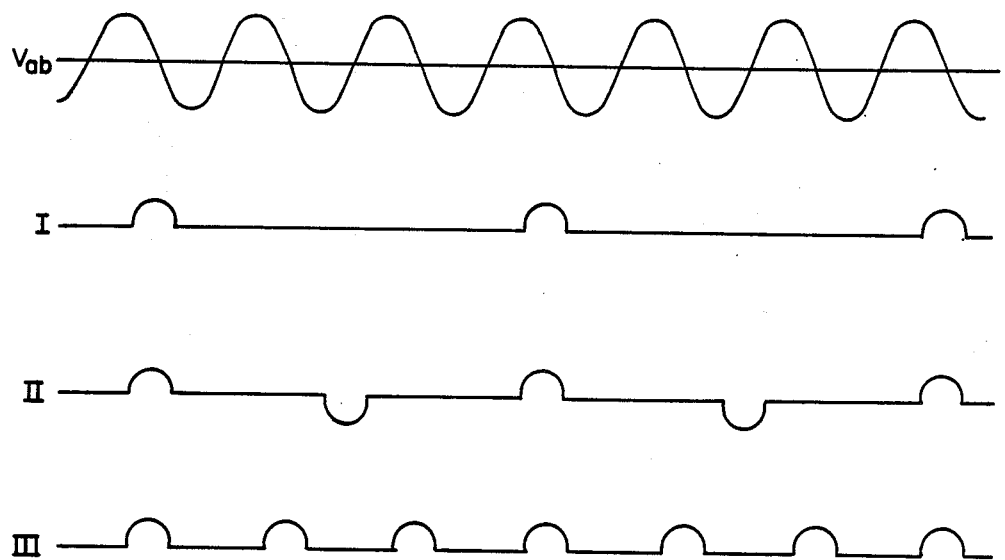
FIG. 2 is a conceptual illustration of the waveforms of the voltage in one phase of the a.c. power, and the current applied to brake the motor at three speeds as the motor slows.

As the motor 10 slows down, the phase relationship between the back emf voltage Vc and the supply line voltage Vab changes. As a result, the pairs of SCR's 16 and 17 are triggered more and more frequently thereby increasing the braking force. Waveforms I, II and III of FIG. 2 conceptually illustrate the current Iab that flows through the first and second stator windings 11 and 12 at three progressively slower speeds during the braking. In waveform I, the first and second pairs of SCR's 16 and 17 are triggered only during an occasional positive half cycle of the supply line voltage Vab. As the motor slows, additional triggering occurs during occasional negative half cycles between the positive half cycle triggering as shown by waveform II. It should be understood that the number of cycles of the supply line voltage Vab between the SCR triggering depicted in waveforms I and II is significantly greater than that illustrated. Continued slowing of the motor results in the SCR's being triggered during every cycle of the supply line voltage Vab as illustrated by waveform III. Although the example in FIG. 2 III shows triggering during the positive half cycles, this latter triggering can occur during each positive or negative half cycle. Additional SCR trigger patterns occur between those illustrated in FIG. 2.

Figure 3:
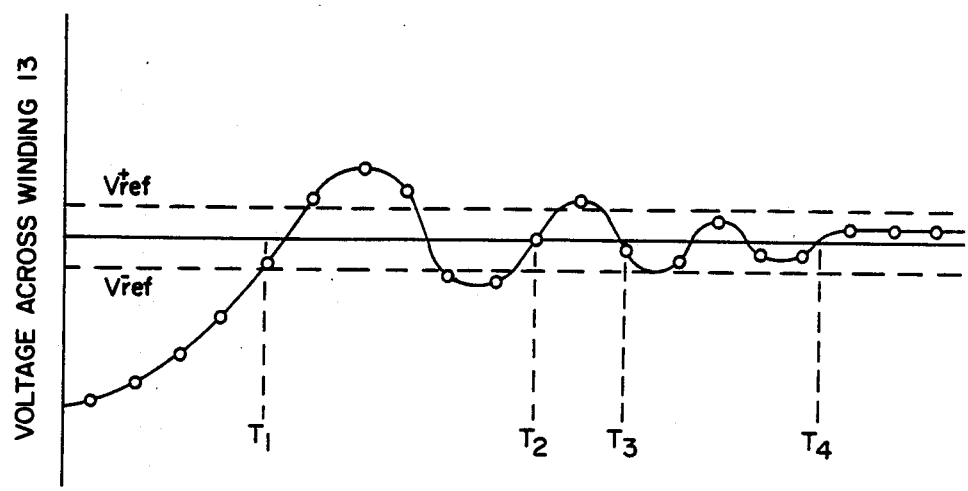
FIG. 3 is a waveform diagram of the back emf voltage induced in a motor winding during the later stages of stopping.

The present invention provides a method for detecting when the motor has stopped so that the triggering of the SCR's and the current applied to the motor thereby can be discontinued. As the motor slows to very near stopping, less and less current is induced in the rotor winding by the braking current Iab. With less current through the rotor winding, the back emf and the voltage it induces across winding 13 decrease. FIG. 3 depicts the voltage induced across the third stator winding 13 in the later stage of the motor stopping. Initially a relatively large negative voltage (referenced to the neutral node 15 of the motor 10) is induced as a result of a positive current Iab in windings 11 and 12. With further reduction in motor speed, the back emf voltage induced in the third winding 13 begins ringing about zero volts with the absolute voltage magnitude with respect to that axis continuing to decrease. Eventually after time $T_4$, the induced voltage settles at a voltage level which is relatively close to zero volts.

It should be noted that if the braking current Iab flows in the opposite direction to that illustrated in FIG. 1, the back emf voltage waveform of FIG. 3 will be inverted. That is, it will initially have a positive value prior to time $T_1$. Furthermore, for ease of illustration, the time scale of FIG. 3 has been compressed with more cycles occurring between times $T_1$, $T_2$, $T_3$ and $T_4$ than are illustrated.

The present invention takes advantage of this back emf induced voltage pattern to determine when the motor has stopped. The technique for making this determination is implemented in a software routine for the microcomputer 21 of the motor controller 20 illustrated in FIG. 1. The software routine for braking the motor begins by the microcomputer 21 initializing the addresses in its memory that contain the values of the variables and counters used in the routine, as depicted at step 70 of the flowchart of FIG. 4A. The present value (TIME) of the microcomputer timer is saved in memory as time $T_0$ at step 71 to indicate when the braking commenced. Once the initialization is complete, the microcomputer 21 checks an interrupt flag at step 72 to determine if the zero crossing detector 60 has found a crossing. If this flag is not set, the program loops, continually checking the interrupt flag.

Figure 4B:
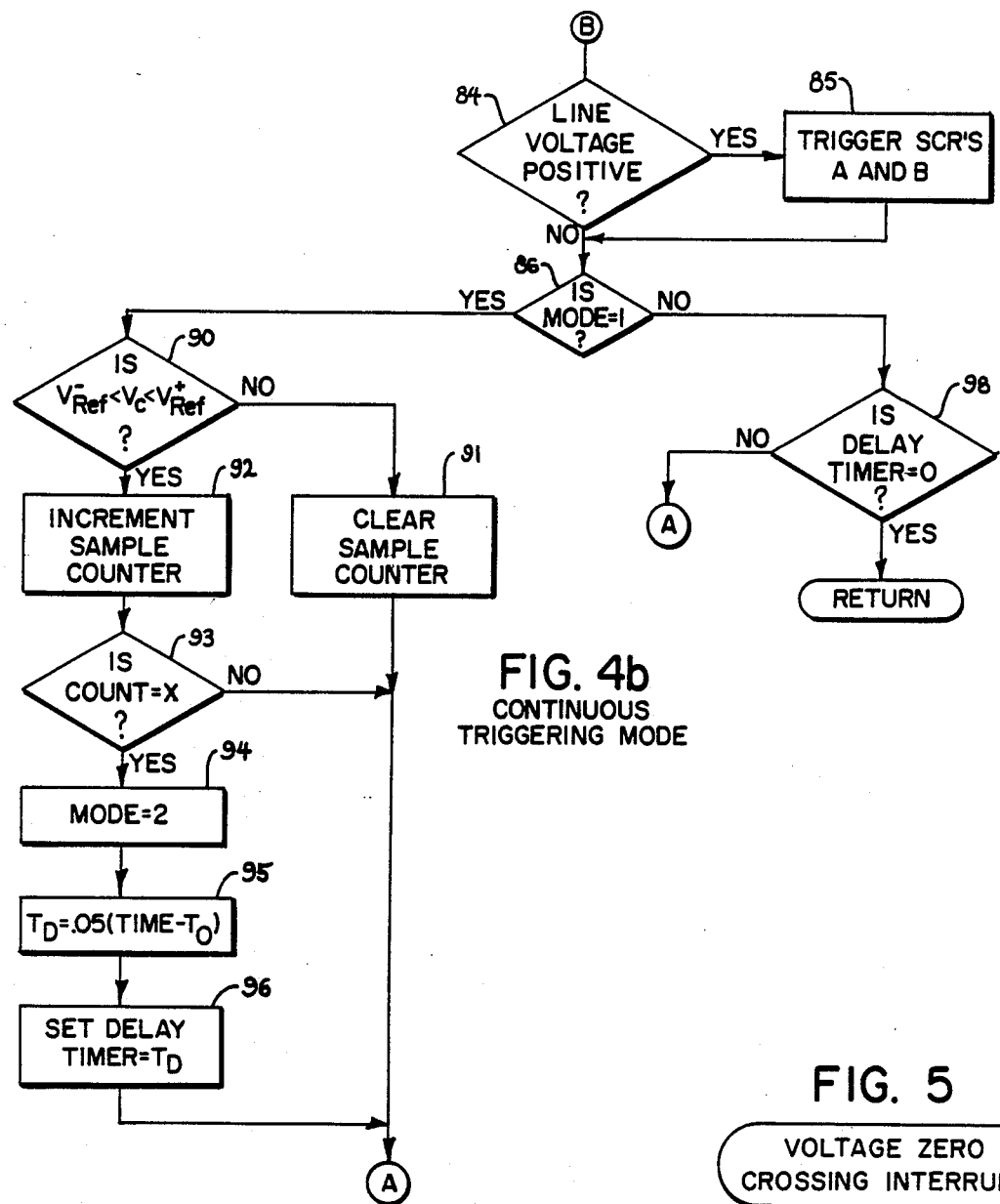
Figure 5:
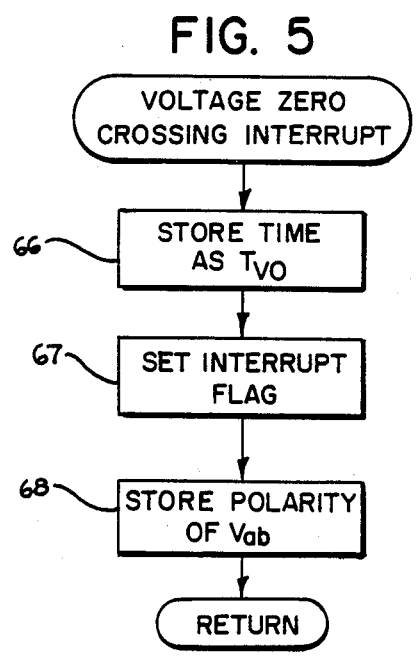
FIG. 5 is a flow chart of the voltage zero crossing interrupt routine for the motor controller.

The flag is set by an interrupt routine illustrated in FIG. 5, which is executed whenever the detector 60 senses a zero crossing of the voltage Vab across the A and B supply lines. Whenever this voltage crossing occurs, the microcomputer 21 is interrupted and, at step 66, loads the value (TIME) of its timer into a memory location designated $T_{vo}$ to store the time at which the zero crossing occurred. The interrupt flag is set at step 67 and the polarity of the instantaneous voltage across the A and B supply lines (as sensed by voltage comparator 55) is stored in the microcomputer memory at step 68. The interrupt routine then ends by returning to the step of the flow chart in FIGS. 4A and 4B that was being executed when the interrupt occurred. Typically, a zero crossing will occur while the program is looping through step 72.

Referring again to FIG. 4A, when the setting of the interrupt flag is sensed at step 72, the flag is reset at process block 73 and the program execution advances to step 74. A constant delay interval is added to the stored zero crossing time $T_{vo}$ to determine the time ($T_{FIRE}$) at which trigger the A and B phase SCR pairs 16 and 17 for motor braking. The shorter the delay the sooner in the voltage half cycle the SCR's will be triggered and the stronger the braking force. A minimum delay is provided to insure that the SCR's will not be triggered until the alternating current through them from the previous triggering has gone to zero and the SCR's have turned off. The present value of the microcomputer timer (TIME) then is compared to the triggering time ($T_{FIRE}$) at step 75. If it is not time to trigger the SCR's, the program loops until the proper time.

At that proper time, the program exits the loop and advances to step 76 where the microcomputer 21 examines the input level from voltage comparator 24 representing the polarity of the back emf voltage $V_c$ induced across the third stator winding 13. At the same time, the microcomputer 21 samples the input from AND gate 40, which indicates whether the back emf voltage $V_c$ is greater than the negative voltage reference level $V^-_{REF}$ and less than the positive voltage reference level $V^+_{REF}$. The input from the AND gate is stored in the microcomputer's internal memory for later use, as will be described. Since the sensing of the back emf induced voltage occurs at time ($T_{FIRE}$), but prior to triggering the SCR's, the voltage is sensed when electricity from the supply is not flowing through the motor. This insures that the voltage being sensed across the third stator winding 13 is from the back emf and not due to inductive coupling of the supply current Iab flowing through stator windings 11 and 12.

The program execution then advances to step 77 where an operation mode indicator variable (MODE) is examined to determine if the controller is in the discontinuous triggering mode (i.e. MODE=0). In this mode of braking operation, the first and second pairs of SCR's 16 and 17 are not as yet being triggered during every cycle of the supply line voltage Vab. As noted previously, when the braking begins these SCR pairs 16 and 17 are fired only once every several cycles of the supply voltage. Therefore, initially the braking apparatus will be in the discontinuous triggering mode.

During this discontinuous mode of operation, commencing at step 78, the microcomputer 21 compares the polarity of the sensed back emf voltage Vc to the polarity of the voltage Vab across supply lines A and B as detected by comparator 55. If these polarities are the same, that is the voltages are both positive or negative with respect to ground potential, a half-cycle counter in the microcomputer memory is incremented at step 79 and the program returns to step 72 to await another zero voltage crossing.

As explained above, the first and second SCR pairs 16 and 7 are triggered in the discontinuous mode only when the back emf induced voltage Vc and the supply line voltage Vab are opposite in polarity with respect to ground potential. When this polarity condition is detected by the microcomputer 21 at step 78, a determination is made at step 80 as to whether these pairs of SCR's now are being triggered during every cycle of the supply line voltage. The SCR's are being triggered with this frequency when only one cycle of the supply line voltage occurs between triggerings. This occurrence indicated by the half-cycle counter having the value one when it is read at step 80. When the SCR's begin being triggered every cycle, the program enters the continuous firing mode where the SCR's 16 and 17 are fired during every supply voltage cycle regardless of the back emf polarity. At this point, the motor has slowed considerably and the back emf voltage polarity begins fluctuating as shown in FIG. 3. Therefore, the back emf voltage is no longer a reliable indicator of when to apply a braking current to the motor. When the SCR's are triggered during every supply voltage cycle, the MODE variable is incremented at step 81, otherwise the half-cycle counter is reset at step 82.

Then, the first and second pairs of SCR's 16 and 17 are triggered by the microcomputer 21 applying a brief pulse to their gate electrodes at step 83. This triggering renders the SCR's conductive and sends a current Iab through the first and second stator coils 11 and 12. The current Iab generates an electromagnetic field that interacts with the magnetic field from the rotor to slow the rotor. Specifically, the SCR's are triggered at times when the electromagnetic field interaction will produce a negative torque in the motor. Once triggered, the SCR's remain conductive until the alternating current Iab goes to zero. Then, the SCR's turn off and remain so until triggered again. After the SCR's are triggered, the program execution returns to step 72 to await another zero crossing of the voltage across supply lines A and B.

Eventually, the motor 10 will slow down to approximately thirty percent of its normal running speed prior to the initiation of the braking. At this point, the SCR's begin to be triggered during every cycle of the supply line voltage, either during every positive or negative half cycle. This event is detected at step 80 and the operation mode indicator variable is incremented (MODE=1) to designate that the continuous firing mode has been entered.

Thereafter, the program execution branches every time from decision block 77 to the first step 84 of the continuous firing mode branch on FIG. 4B. This program branch triggers the first and second SCR pairs 16 and 17 during every cycle of the supply line voltage Vab and detects when the back emf voltage induced in winding 13 is within the reference voltage range for a given number of consecutive cycles. In the described embodiment the SCR pairs 16 and 17 now are triggered during every positive half cycle of the supply voltage Vab regardless of the polarity of the back emf voltage induced in winding 13. The selection of the positive half cycle is arbitrary and every negative half cycle could have been used. At the beginning of this program branch at step 84, the microcomputer 21 examines the output of the voltage comparator 55 to determine if the voltage across the A and B supply lines is positive with respect to the supply neutral, or ground. If the supply voltage is positive, the two SCR pairs 16 and 17 are triggered at step 85 before advancing to step 86.

At step 86 on FIG. 4B, the microcomputer 21 examines the MODE variable. The first time that this examination is made, the MODE variable will equal one and the program execution will branch to step 90. At this point, the microcomputer 21 examines the input from AND gate 40 that was previously sampled at step 76. This input indicates whether the back emf voltage Vc is greater than the negative voltage reference level $V^-_{REF}$ and less than the positive voltage reference level $V^+_{REF}$.

In the continuous triggering mode, the back emf voltage Vc comparison is sampled by the microcomputer 21 during every half cycle of the supply voltage Vab, as indicated by the circles on the voltage waveform of FIG. 3. Prior to approximately time $T_3$, the back emf voltage samples can vary inside an outside of the reference voltage range. For example, the back emf voltage sample just prior to time $T_1$ is outside of the range $V^-_{REF}$ to $V^+_{REF}$. Therefore, when evaluating this sample, the program execution branches from step 90 to step 91 where a sample counter in the microcomputer memory is cleared before returning to step 72.

Since the sample taken at time $T_1$ is within the range, when this sample is evaluated, the program execution advances from step 90 to step 92. At this stage, the sample counter in the microcomputer memory is incremented and then checked at step 93. The count in the sample counter indicates the number of consecutive back emf voltage samples which fall within the reference voltage range. Until this count equals a preset number X, for example fifteen, the program execution will return to step 72.

Since the next sample after time $T_1$ is outside of the reference voltage range. This sample will cause the program execution to branch to step 91 where the sample counter will be reset to zero.

From time $T_3$ on, the back emf voltage samples are all within the reference voltage range $V^-_{REF}$ to $V^+_{REF}$. The sample counter now will be incremented at step 92 by each consecutive voltage sample until fifteen such samples occur. At this point, the program execution will advance from step 93 to step 94 where the MODE variable is set equal to two. Then, at step 95, the microcomputer 21 calculates a braking current shut-off delay interval $T_D$. For example, this delay interval is five percent of the time that it took the motor speed to decrease from full speed when braking commenced (at time $T_0$) to when the fifteen consecutive samples were found within the reference voltage window (i.e. the present timer value). Although five percent of this time period produces satisfactory results with motors tested by the present inventors, other percentages may produce optimum results with other motors and loads. If the motor was below full speed when braking commenced, the calculated delay may be too short. Therefore, as a safeguard, the shut-off delay interval $T_D$ should have a minimum value, for example one second. Alternatively, a fixed delay period can be employed, however unless this fixed period is set for a specific motor and load, the motor may not stop within the delay period. Once the delay interval $T_D$ has been calculated, a delay timer within the microcomputer 21 is set to that interval at step 96. The delay timer is decremented at a fixed rate as a background operation of the microcomputer in a conventional manner.

Since the MODE variable at this point equals two for the remainder of the braking process, the program execution will branch from step 86 to step 98 after each subsequent firing of the A and B phase SCR pairs 16 and 17. At this step, the delay timer is checked to determine if it has timed out. As long as the timer has a non-zero value, the program execution continues to loop back to step 72. When the delay timer reaches zero, the motor braking routine ends by returning to the main motor control program.

As is apparent from the description of the present invention given above, the back emf voltage induced in an inactive winding 13 of the motor during braking is used to determine when the motor has stopped. By detecting when this back emf voltage is within a small range of voltages around the zero volt level for a certain period, an indication is given that the motor is about to stop. This indication commences a shut-off delay interval at the expiration of which the application of current to brake the motor terminates.

Alternatively, rather than using two reference voltage levels ($V^-_{REF}$ to $V^+_{REF}$), a single voltage level could be employed. For example at step 90 the back emf induced voltage could be compared only to $V^-_{REF}$ and when the voltage was greater than the single reference, a branch to step 92 occurs. In this case the range of voltage levels being detected at step 90 are those levels which are greater than the single reference level (i.e. between the reference level and infinity). However with this alternative, the final mode of operation will commence sooner (i.e. at time $T_2$) and a longer delay period will have to be provided.

Furthermore, the operation of the present motor stoppage detection apparatus adapts to the characteristics of the motor and load. The final shut-off delay is directly proportional to the time it takes the motor to decrease from full speed to when the back emf is within the defined voltage range for a set interval. Therefore, even if the motor and load characteristics vary, the motor stoppage detection is adjusted accordingly.

We claim:

1. An apparatus for determining when an electric motor has stopped comprising:
    means for sensing the level of the back emf voltage induced in a winding of the motor;

a first means for comparing the level of the back emf voltage to a first reference voltage level;

a second means for comparing the level of the back emf voltage to a second reference voltage level;

means, responsive to said first and second means for comparing, for determining when the level of the back emf voltage is between the first and second reference voltage levels;

means for calculating the amount of time that the level of the back emf voltage is between the first and second reference voltage levels, and in response thereto producing a signal indicative of motor stoppage when the amount of time reaches a predetermined value.

2. The apparatus as recited in claim 1 wherein the first reference voltage level has a positive value with reference to ground potential; and wherein the second reference voltage level has a negative value with reference to ground potential.

3. An apparatus for determining when an electric motor has stopped comprising:

means for sensing the level of the back emf voltage induced in a winding of the motor;

means for periodically producing an indicium of whether the sensed level of the back emf voltage satisfies a predefined criterion;

means for producing a count of the number of consecutive indicia which indicate that the level of the back emf voltage satisfies the predefined criterion; and means for generating an output signal indicative of motor stoppage in response to the count equaling a predetermined number.

4. The apparatus as recited in claim 3 wherein the predefined criterion of said means for periodically producing an indicium is whether the sensed level of the back emf voltage is greater than a reference voltage level.

5. The apparatus as recited in claim 3 wherein the predefined criterion of said means for periodically producing an indicium is whether the sensed level of the back emf voltage is less than a reference voltage level.

6. The apparatus as recited in claim 3 wherein the predefined criterion of said means for periodically producing an indicium is whether the sensed level of the back emf voltage is between first and second reference voltage levels.

7. The apparatus as recited in claim 6 wherein said means for periodically producing an indicium includes:

a first means for comparing the sensed back emf voltage to the first reference voltage level;

a second means for comparing the sensed back emf voltage to the second reference voltage level; and means, responsive to the first and second means for comparing, for periodically making a determination whether the back emf voltage is between the first and second reference voltage levels and producing an indicium of that determination.

8. The apparatus as recited in claim 7 wherein the first reference voltage level has a positive value with reference to ground potential; and wherein the second reference voltage level has a negative value with reference to ground potential.

9. The apparatus as recited in claim 3 wherein said means for generating produces a signal indicative of motor stoppage a given interval of time after the count equals the predetermined number.

10. An apparatus for stopping an electric motor comprising:

means for periodically applying pulses of electricity to the motor to slow the speed of the motor;

means for periodically producing an indicium of whether the level of the back emf voltage induced in a winding of the motor satisfies a predefined criterion;

means for producing a count of the number of consecutive indicia which indicate that the level of the back emf voltage satisfies the predefined criterion; and means for terminating the application of electricity to the motor in response to the count equaling a predetermined number.

11. The apparatus as recited in claim 10 wherein the predefined criterion of said means for periodically producing an indicium is whether the sensed level of the back emf voltage is greater than a reference voltage level.

12. The apparatus as recited in claim 10 wherein the predefined criterion of said means for periodically producing an indicium is whether the sensed level of the back emf voltage is less than a reference voltage level.

13. The apparatus as recited in claim 10 wherein the predefined criterion of said means for producing an indicium is whether the sensed level of the back emf voltage is between first and second reference voltage levels.

14. The apparatus as recited in claim 13 wherein said means for periodically producing an indicium includes:

means for sensing the back emf voltage induced in a winding of the motor when electricity is not being applied to the motor;

a first means for comparing the sensed back emf voltage to the first reference voltage level;

a second means for comparing the sensed back emf voltage to the second reference voltage level; and means, responsive to the first and second means for comparing, for determining whether the back emf voltage is between the first and second reference voltage levels and producing an indicium of that determination.

15. The apparatus as recited in claim 13 wherein one of the two reference voltage levels has a positive value with reference to ground potential; and wherein the other reference voltage level has a negative value with reference to ground potential.

16. The apparatus as recited in claim 10 wherein said means for terminating ceases the periodic application of pulses of electricity to the motor a given interval after the count equals the predetermined number.

17. The apparatus as recited in claim 16 wherein said means for terminating further comprises means for deriving the given interval from the amount of time that elapses between when pulses of electricity begin to be applied to slow the speed of the motor and when the count equals the predetermined number.

18. The apparatus as recited in claim 10 wherein said means for periodically applying pulses of electricity to the motor includes means for sensing the polarity of the voltage from a source of alternating electricity; and means for applying the electricity to the motor in response to the polarity of the voltage from the source being opposite to the polarity of back emf voltage induced in a winding of the motor.

19. The apparatus as recited in claim 10 wherein said means for periodically applying pulses of electricity to the motor includes:
   means for sensing the polarity of the voltage from a source of alternating electricity;
   means for applying electricity from the source to the motor in response to the polarity of the voltage from the source being opposite to the polarity of back emf voltage induced in a winding of the motor;
   means for detecting when the electricity is applied to the motor during every cycle of the alternating electricity from the source; and
   means, responsive to said means for detecting, for causing said means for applying to apply electricity to the motor during every cycle of the alternating electricity regardless of the polarity of the back emf voltage induced in a wining of the motor.

20. The apparatus as recited in claim 19 wherein said means for producing an indicium operates in response to said means for detecting when the electricity is applied to the motor during every cycle of the electricity from the source.

21. A method for stopping an electric motor comprising the steps of:
   sensing the polarity of the voltage from a source of alternating electricity;
   periodically sensing the back emf voltage induced in a winding of the motor when electricity from the source is not being applied to the motor;
   initially applying electricity from the source to the motor in response to the polarity of the voltage from the source being opposite to the polarity of back emf voltage induced in a winding of the motor, which application of electricity produces a negative torque in the motor;
   detecting when the electricity is applied to the motor during every cycle of the alternating electricity from the source;
   when electricity is applied to the motor during every cycle of the alternating electricity from the source, thereafter applying electricity to the motor during every cycle of the alternating electricity regardless of the polarity of the back emf voltage induced in a winding of the motor;
   periodically producing an indicium of whether the level of the back emf voltage induced in a winding of the motor is within the predetermined range of values;
   counting of the number of consecutive indicia which indicate that the level of the back emf voltage is between the two predetermined voltage levels; and
   terminating the application of electricity to the motor in response to the count equaling a predetermined number.

22. The method as recited in claim 21 wherein said step of periodically producing an indicium includes:
   comparing the sensed back emf voltage to a first reference voltage;
   comparing the sensed back emf voltage to a second reference voltage; and
   determining, in response to the steps of comparing, whether the back emf voltage is between the first and second reference voltages and producing an indicium of that determination.

23. The method as recited in claim 21 wherein said step of terminating the application of electricity includes:
   calculating a delay interval as a function of the amount of time between when the electricity is first applied to produce a negative torque in the motor and when the count equals the predetermined number; and
   terminating the application of electricity to the motor at the expiration of the delay interval.

* * * * *